United States Patent
Ruchlak et al.

[11] 3,970,610
[45] July 20, 1976

[54] POLYMERIZATION PROCESS

[75] Inventors: Kasimir Ruchlak, Burgkirchen, Alz; Ernst-August Albers, Bobingen; Walter Fester, Konigstein, Taunus, all of Germany

[73] Assignee: Hoechst Aktiengesellschaft, Germany

[22] Filed: Oct. 8, 1974

[21] Appl. No.: 513,146

[30] Foreign Application Priority Data
Oct. 10, 1973    Germany............................ 2350720

[52] U.S. Cl................................. 526/62; 260/884; 526/74; 526/344
[51] Int. Cl.² ...................... C08F 2/18; C08F 14/06
[58] Field of Search .............................. 260/92.8 W

[56]         References Cited
            UNITED STATES PATENTS

| 3,414,496 | 12/1968 | Sudbury et al...................... 204/147 |
| 3,489,663 | 1/1970 | Bayer et al............................ 204/59 |
| 3,505,186 | 4/1970 | Sarazin et al. ........................ 204/73 |
| 3,562,238 | 2/1971 | Parks ........................... 260/92.8 W |
| 3,642,745 | 2/1972 | Golstein ....................... 260/92.8 W |
| 3,738,974 | 6/1973 | Takehisa et al............... 260/92.8 W |
| 3,842,055 | 10/1974 | Gabriel et al................ 260/92.8 W |
| 3,882,195 | 5/1975 | Daniels et al. ................ 260/92.8 W |

FOREIGN PATENTS OR APPLICATIONS

| 83,887 | 8/1971 | Germany |
| 930,281 | 7/1963 | United Kingdom |

OTHER PUBLICATIONS

Fibres From Synthetic Polymers, Hill, R. (Ed.), Elsevier Publ. Co., Amsterdam (1953), pp. 4, 65 & 77.

Primary Examiner—Alan Holler
Attorney, Agent, or Firm—Connolly and Hutz

[57]         ABSTRACT

The present invention relates to a vessel and a process for polymerizing vinyl chloride in suspension. The vessel the inner surfaces of which consist of stainless steel or are plated with a noble metal comprises at least one cathode in contact with the reaction medium and insoluble therein and as anode the metallic inner surface of the vessel, the cathode and anode being connected over an external source of current. The polymerization is carried out with electrolytic generation of hydrogen and oxygen from the polymerization medium. The polymerization vessel and process according to the invention suppress completely or substantially the formation of wall deposits.

9 Claims, 1 Drawing Figure

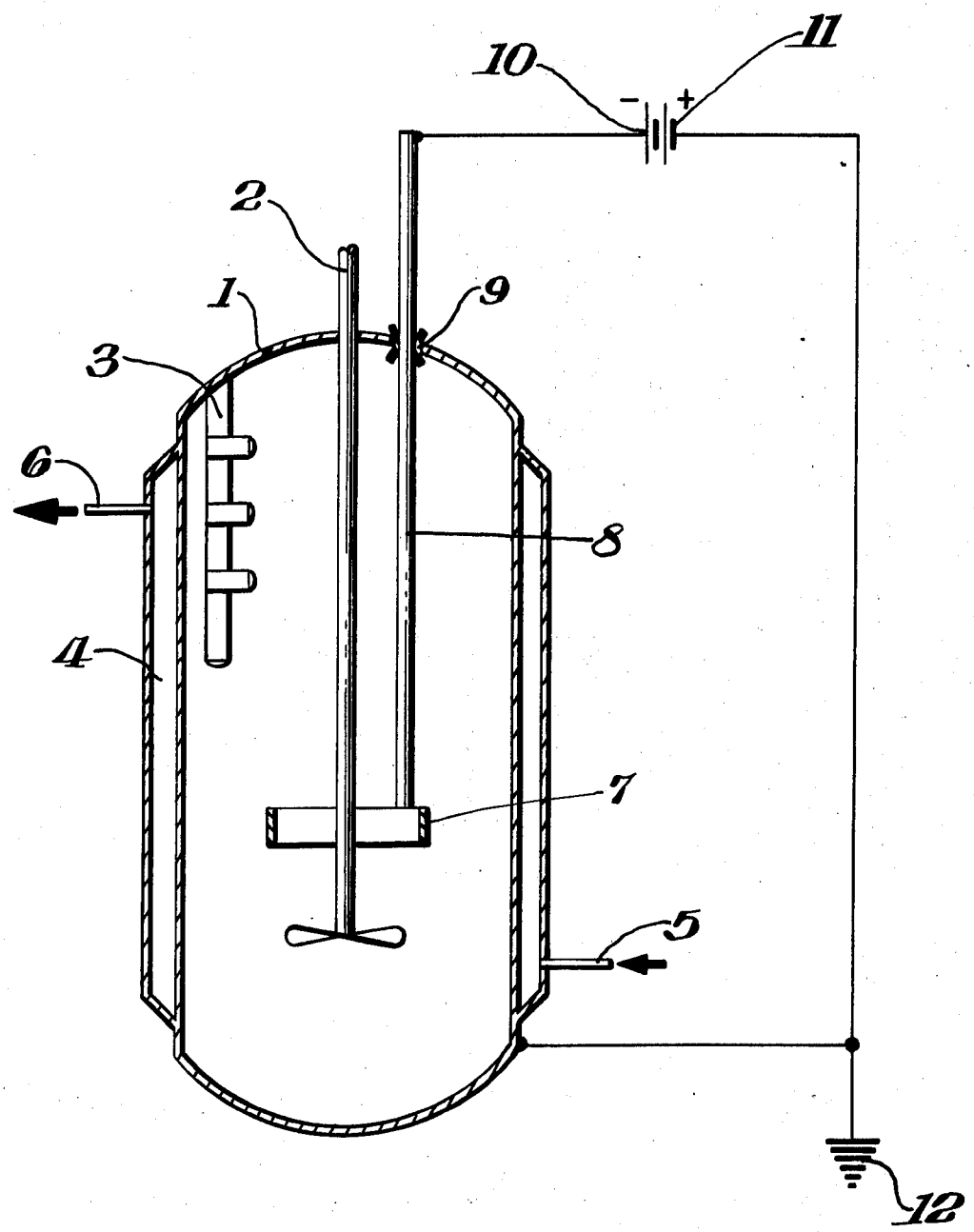

POLYMERIZATION PROCESS

The present invention relates to an improvement in the process for polymerizing vinyl chloride in suspension in reactors lined with stainless steel or a noble metal to reduce the formation of wall deposits; it also relates to a reactor suitable for carrying out the said process.

Vinyl chloride polymers are produced on a large scale by suspension polymerization in aqueous medium. In this process the monomer or mixture of monomers is dispersed in the aqueous phase and polymerized in the presence of monomer soluble activators and so-called suspension stabilizers. An important problem in this process is the formation of polymer deposits on the reactor wall, which may give rise to troubles in the performance of the reaction and deteriorate the quality of the products obtained. In the first place, after a short polymerization period the dissipation of heat through the reactor wall is considerably reduced or even becomes impossible and, moreover, the detaching or peeling off of a formed wall deposit during the polymerization may contaminate the polymer. When products of this type are further processed into sheets or extruded articles the known fish eyes are formed. To avoid these disadvantages it is therefore necessary to remove the deposit from the reactor wall. The polymer deposits may occur in the form of a paper-like contiguous layer, a thin powdery layer or as thick lumps. In general, the reactor is cleaned by means of high pressure sprayers with water or another liquid. With heavy deposit formation entering of the reactor for manual cleaning cannot be avoided. Such cleaning operations of large reactors often require a period of several hours whereby the reactor capacity is reduced, especially in continuously operating plants, and the production costs are increased.

Attempts have, therefore, been made to reduce or even avoid the formation of such deposits in the suspension polymerization of vinyl chloride. German Auslegeschrift 1,072,812, for example, describes a process wherein the suspension polymerization is carried out in the presence of a combination of protective colloids, oxygen-containing organic emulsifiers forming complex compounds with the protective colloids used and alkaline earth metal chlorides or alkali metal phosphates. However, in this process the formation of wall deposits is reduced but slightly.

It has also been proposed to use in the suspension polymerization of vinyl chloride a special activator combination of azonitriles or azonitriles with monomer soluble organic peroxides, advantageously in an alkaline medium (U.S. Pat. No. 3,753,966). By this process, too, only a partial reduction of the formation of wall deposits in the polymerization is obtained.

In another known process to avoid polymer formation on the inner wall of the autoclave in the suspension polymerization of vinyl chloride the temperature of the cooling agent in the cooling jacket of the autoclave is maintained at a temperature of at most −15°C during the first three quarters of the polymerization period and during the last quarter it does not exceed 0°C (German Offenlegungsschrift 2,033,780). This process can only be used for large scale autoclaves having a capacity of over 100 cubic meters. Owing to the low temperature of the cooling medium the deficient amount of heat necessary for the polymerization must be supplied by a steam heating which involves difficulties in the polymerization control and keeping constant of the reactor content.

According to a further known process the wall temperature is maintained at least at the level of the inside temperature of the reactor, i.e. any effective cooling through the wall is dispensed with (German Offenlegungsschrift 1,520,609). It is, however, very disadvantageous when the entire reaction heat has to be removed exclusively over a reflux condenser.

According to the latter two processes the formation of wall deposits cannot be fully avoided either. It is not possible to maintain all inner surfaces in the reactor at the required temperature, for example stirrer, thermocouple, mandrel, so that on these parts deposits are still formed.

In literature a process is described according to which the polymerization of acrylonitrile in aqueous medium is carried out in a vessel of ferrous metal in the presence of a base metal electrode, wherein the electrode is immersed in the polymerization medium and electrically connected with the material of the polymerization vessel by a conduit outside of said medium. The electrode consists of a metal the potential of which in the polymerization medium should be positive with respect to the metal of the polymerization vessel. It, therefore, acts as soluble anode. The metal of this soluble anode migrates to the wall of the polymerization vessel connected as cathode; it should, however, be sufficiently electropositive or have a sufficient reducing action in order that it can dissolve again in the reaction medium with formation of hydrogen (U.S. Pat. No. 3,505,186). This process has the drawback that reactor and electrode material are constantly consumed and a contamination of the polymer formed with the corresponding metal ions cannot be avoided. It is unsuitable for the polymerization of vinyl chloride as the use of base metals is not allowed for safety reasons.

It is the object of the present invention to provide a simple process for the suspension polymerization of vinyl chloride essentially without formation of wall deposits, not only in a batch process but also in a continuous process over a prolonged period of time.

It has already been proposed to avoid the formation of wall deposits by electrolysis in an aqueous polymerization medium by applying an external voltage and connecting the reactor wall as cathode and an electrode placed in the reaction medium or being in contact therewith as anode. It has been found, however, that high current densities are required to avoid the formation of deposits especially in the suspension polymerization of vinyl chloride or of vinyl chloride with determined amounts of suitable comonomers. With low current densities a certain amount of deposit is formed, although to a lesser extent and with a weaker adhesiveness as in the polymerization without electrolysis, which deposit can be readily removed from the reactor wall.

Surprisingly, it has been found that the formation of wall deposit in the suspension polymerization of vinyl chloride or of vinyl chloride with determined amounts of suitable comonomers can be suppressed completely or substantially by exchanging the poles in the electrolysis.

The present invention provides a process for the suspension polymerization of vinyl chloride, suspension copolymerization or suspension graft polymerization of vinyl chloride with up to 20% by weight of monomers capable of being copolymerized or graft-polymerized with vinyl chloride, in the presence of monomer soluble activators, suspension stabilizers and ionic and/or nonionic auxiliary suspension stabilizers, in vessels the inner walls of which consist of stainless steel or are plated with a noble metal, wherein the metallic walls and inner parts of the polymerization vessel are connected as anode and in conductive connection via an external source of current with at least one insoluble cathode in the liquid medium of the polymerization system, with application of an external voltage the polymerization takes place with electrolytic generation of hydrogen and oxygen and the electrolysis conditions in the polymerization medium are such that no important anodic dissolution of the reactor wall occurs.

The suspension polymerization of vinyl chloride and the copolymerization or graft polymerization of vinyl chloride with other monomers is carried out under the usual conditions in the presence of known suspension stabilizers and auxiliary suspension stabilizers as described for example in U.S. Pat. Nos. 3,691,080 and 3,663,520, for example, water soluble cellulose derivatives, like ethers (hydroxymethyl or hydroxypropyl cellulose, methyl cellulose, methyl hydroxypropyl cellulose, methoxyethyl or methoxypropyl cellulose), gelatin, glue, dextran, polyvinyl alcohol, partially acetylized polyvinyl alcohol or partially saponified polyvinyl esters. Mixtures of the various stabilizers may also be used.

Auxiliary suspension stabilizers may additionally be added, such as cationic, anionic, amphoteric or nonionic emulsifiers, like anionic tensides, above all alkyl-, aryl- and aryl-alkyl-sulfonates, alkyl-sulfates, alkali metal salts especially sodium and potassium salts of sulfo-succinic acid esters and salts of higher fatty acids. Suitable nonionic auxiliary stabilizers are, for example, polymers and copolymers of alkylene oxides, especially of ethylene and propylene oxide, the alkyl and aryl ethers and esters thereof, sorbitan fatty acid esters and the condensation products thereof with alkylene oxides.

The suspension stabilizers are suitably used in amounts of from 0.01 to 1% by weight, particularly from 0.05 to 0.3% by weight and the auxiliary suspension agents in amounts of from 0.01 to 0.1% by weight, both based on the weight of vinyl chloride or mixed monomers.

The polymerization is carried out in the presence of monomer soluble activators conventionally used in the suspension process as for example described in U.S. Pat. Nos. 3,691,080 and 3,663,520, preferably peroxides, peroxy compounds and certain azo compounds, for example, tert. butyl hydroperoxide, acetylcyclohexane-sulfonyl peroxide, perbenzoate, perpivalate, cumylperalkyl- or -peraryl-oxy acetate, especially tert. butyl- or cumyl-perphenoxy acetate, percarbonates such as diisopropyl percarbonate or alkylaryl percarbonates with longer alkyl chains, azonitriles of the formula

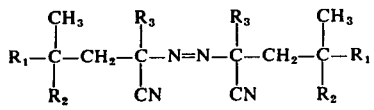

in which $R_1$, $R_2$ and $R_3$ each are hydrogen or an alkyl radical having from 1 to 6 carbon atoms. The aforesaid activators can be used either individually or as mixtures. Also mixtures of monomer-soluble with water soluble catalysts, like hydrogen peroxide and potassium persulfate can be employed, the ratio being preferably greater than 1.

The catalysts are employed in the usual amounts for the suspension process, i.e. generally between 0.001 to 3% by weight, preferably 0.01 to 0.3% by weight, based on the weight of the vinyl chloride or the mixed monomers.

The polymerization is preferably carried out at a temperature in the range of from about 30° to about 80°C, but this limit is not critical, other usual temperatures are also possible.

The voltage necessary for the electrolytic production of hydrogen and oxygen depends on the shape and the dimensions of the polymerization vessel and on the arrangement of the electrodes in the vessel. It further depends on the current density and — in connection therewith — the intensity of the generation of oxygen and hydrogen required in each case to avoid the formation of a deposit. The current density applied may be extremely low or even very high, depending on the polymerization conditions and the type of autoclave used. Current densities in the range of from about 5 to 3,000 and preferably 20 to 800 milliamperes/m² proved to be advantageous. The current density obtained depends, of course, on the construction of the vessel, the reaction medium and on the type and amount of supporting electrolytes or buffer substances. It proved particularly advantageous to choose at the beginning of the polymerization, during which the tendency to deposit formation is especially pronounced, a higher current density and to reduce the current density in the latter phase of the polymerization.

The type of material and the surface structure of the polymerization vessel and the inner elements and the type of material and surface structure of the reactants introduced into the vessel also determine the voltage to be applied. Ranges of general applicability cannot be given. The optimum external voltage to be applied in each case can be readily determined by simple preliminary tests. In any case the external voltage should be so high that the excess voltage in the electrolytic oxygen and hydrogen separation is overcome. It is limited by the fact that an anodic dissolution of the reactor wall should be substantially avoided. Thus, the critical value naturally depends on the reactor material used.

Besides the electrolysis conditions, the reaction medium, i.e. the composition of the polymerization mixture, should be chosen in such a manner that no important anodic dissolution of the reactor wall is taking place. The term "no important anodic dissolution" is intended to cover such cases in which the dissolution is practically not higher than in a polymerization carried out without current, as well as those in which it is five or even ten fold higher. In the latter case it should be kept in mind that in the known polymerization without electrolysis, besides an unavoidable dissolution of the reactor wall, losses of reactor material always occur in the frequent removal of the wall deposits, which losses may be much higher than the above limiting value. If in some cases, the advantages in accordance with the present invention justify a higher wear of the reactor wall the limiting value may still be higher than indicated above.

The polymerization can be carried out in a neutral, alkaline or acid medium under the known suspension polymerization conditions of vinyl chloride. The pH of the starting polymerization mixture is generally in the range of from 1 to 12, preferably 2 to 10 and more preferably 2.5 to 7.5. To adjust the pH in the acid or basic range acids and bases may be added, for example phosphoric acid, hydrochloric acid, sulfuric acid, carboxylic acids such as acetic acid, citric acid; alkali metal hydroxides, or ammonia. If corrosive media are used, such as HCl or $H_2SO_4$, a noble metal or noble metal plated reactor should be used. The use of a reactor of this type may also be of advantage with regard to other electrolysis conditions. Preferably buffer substances are added, for example, acetates, citrates, dihydrogen phosphates, hydrogen phosphates, or bicarbonates, especially of the alkali metals. Alternatively, any other known buffer substance to adjust a definite pH value may be used. A particularly preferred system consists of $Na_2HPO_4/NaH_2PO_4/H_3PO_4$. The amounts of these buffer substances depend on the pH value to be desired and are mostly in the range of from 0.03 to 5% by weight, preferably 0.1 to 2% by weight, based on the monomer or the monomer mixture.

When the conductibility of the polymerization mixture is not high enough to obtain a sufficient current density supporting electrolytes of the known type may be added; preferably the buffer substances used. Undesired secondary reactions under electrolysis conditions can be avoided by applying a lower current density or modifying the polymerization conditions, especially the concentration of the polymerization mixture.

The process of the invention is used for the homopolymerization of vinyl chloride in suspension or for the copolymerization of vinyl chloride in suspension with other monomers copolymerizable with vinyl chloride, which monomers are used in an amount of up to 20, preferably up to 15% by weight and especially 0.1 to 15% by weight, based on the monomer mixture. The copolymerization of vinyl chloride includes the graft polymerization with the said monomers or polymers made therefrom, these graft-copolymers containing at least 70% by weight, preferably at least 80% by weight of vinyl chloride units, based on the graft-copolymer. Suitable monomers are especially olefinically unsaturated compounds as described for example in U.S. Pat. Nos. 3,663,520 and 3,691,080, above all, vinyl esters of linear or branched carboxylic acids having from 2 to 20 and preferably from 2 to 4 carbon atoms, for example, vinyl acetate, vinyl propionate, vinyl butyrate, vinyl-2-ethylhexanoate, vinyl fumarate, vinyl stearate; vinyl ethers such as vinylmethyl ether; unsaturated monocarboxylic acids, such as crotonic acid, acrylic acid, methacrylic acid, and the esters thereof with alcohols having from 1 to 10 carbon atoms, for example, the methyl, butyl or octyl esters; unsaturated dicarboxylic acids, such as maleic acid, fumaric acid, itaconic acid, the anhydrides, imides and esters thereof with alcohols having from 1 to 10 carbon atoms. Further suitable comonomers are acrylonitrile, aromatic vinyl monomers such as styrene; $\alpha$-olefins such as ethylene, propylene or butylene; or vinylidene halides, for example, vinylidene chloride. The monomers are used individually or in the form of mixtures with one another.

When the process of the invention is carried out discontinuously the walls of the reactor can be substantially kept free from deposit over long periods of time, i.e. during a great number of polymerizations, so that the time consuming cleaning of the wall with considerable and uncontrolled removal of reactor material can mostly be dispensed with. In a continuous process the operation periods can be considerably prolonged.

The present invention further provides a polymerization vessel to carry out the process of the invention comprising at least one cathode in contact with the polymerization medium and insoluble therein and as anode the metallic inner surface of the polymerization vessel, the cathode and the anode being conductively connected by an external source of current.

When a polymerization vessel having small dimensions is used one cathode in contact with the reaction medium is sufficient. With larger vessels it is expedient, for obtaining a sufficient current density for the electrolytic separation of hydrogen and oxygen, to use either a cathode of suitable geometrical shape, preferably an annular cathode, or to install several cathodes. To avoid reliably the formation of a deposit on the cathode it should be provided with suitable cleaning means, for example, automatically operating brushes or a spraying device. It proved especially advantageous to arrange the cathode(s) not in the reaction medium proper but in a dosing pipe for the necessary polymerization auxiliaries, such as activator, buffer, suspension stablizer, or auxiliary suspension stabilizer, so that it does (they do) not come into contact with the polymer formed. With such a cathode arrangement the respective solution in the dosing pipe to the reaction medium should have a sufficiently high conductivity, which can be ensured by adding small amounts of the aforesaid supporting electrolytes.

The polymerization vessels consist, as is usual in suspension polymerizations of vinyl chloride, of stainless steel or metals plated with stainless steel or with noble metal so that under the chosen electrolysis conditions practically no dissolution of the surface metal of the reactor wall occurs. Under suitable reaction conditions the inner surface of the reactor may consist of another resistant metal, for example, nickel or chromium, titanium, tantalum, silver, gold or platinum. It is expedient to connect as anode not only the inner surface of the reactor but also other inside parts on which a layer could form, for example, stirrer, baffle plates, finger shaped coolers, thermocouples. Of course, care should be taken that the supply lines of the cathodes inside of the reactor are insulated. As cathodes noble metal electrodes (silver, gold, platinum) are preferably used. Other materials such as stainless steel, nickel, chromium, tin, lead or graphite are also suitable.

A device in accordance with the invention will now be described by way of example with reference to the accompanying drawing.

A polymerization vessel of stainless steel 1 is provided with stirrer 2, baffle plate 3 and jacket heating 4, through which a liquid heating medium flows through inlet 5 and outlet 6. Stirrer 2 and baffle plate 3 are likewise made of stainless steel and electrically connected with vessel 1. Approximately in the center of the polymerization vessel an electrode 7 of stainless steel is mounted which surrounds the shaft of the stirrer concentrically at approximately the same distance. The electrode is fastened by holding means 8, which is passed through the wall of the polymerization vessel and electrically insulated with respect thereto. By a dispositif 9 the vertical position of the electrode in the vessel can be varied. By holding means 8 the electrode 7 is connected with the negative pole 10 of a source of current, while the positive pole of said source of current is connected to earth 12 and electrically connected with the polymerization vessel.

The following examples illustrate the invention.

EXAMPLE 1

A 40 liter autoclave lined with stainless steel and provided with stirrer was successively charged with
  28 liters of desalted water
  12 grams of polyvinyl alcohol
  45 grams of $H_3PO_4$
  45 grams of $NaH_2PO_4$
  13.5 grams of diisopropyl percarbonate (40% by weight solution in phthalate)
The pH of the mixture was 2.7.

The autoclave contained a platinum-plated electrode as cathode and the wall of the autoclave was connected as anode. During polymerization a voltage of 20 volts was applied resulting in a current intensity of 250 milliamperes. At the wall of the autoclave the current density was 500 milliamperes/$m^2$. The air contained in the autoclave was removed by repeatedly evacuating and passing through a vinyl chloride gas current. Next, 9 kg of vinyl chloride were forced in, the polymerization mixture was heated to 53°C while stirring and polymerization was continued to a fall in pressure $\Delta p$ of 4 atmospheres gauge. After a polymerization period of 6 hours, the reaction mixture was cooled, the pressure of the autoclave released and the polymerization mixture was discharged. In this manner 10 batches were polymerized one after the other and thereafter the autoclave was opened. The wall of the autoclave and the cathode were fully clean.

EXAMPLE 2 (comparative example)

The polymerization was carried out as described in Example 1, with the exception, however, that the autoclave did not contain a cathode and that no voltage was applied. After removal of the first polymerization batch a slight deposit had formed on the wall of the autoclave. Without cleaning a further batch was polymerized. After discharge, a 1 mm thick deposit had formed which strongly adhered to the wall and had to be removed manually.

EXAMPLE 3

A 40 liter autoclave lined with stainless steel and provided with stirrer was successively charged with
  32 liters of desalted water
  30 grams of hydroxypropyl cellulose
  30 grams of sodium dodecylbenzene sulfonate
  56 grams of $H_3PO_4$
  56 grams of $NaH_2PO_4$
  16.5 grams of diisopropyl percarbonate (40% by weight solution in phthalate)
The starting mixture had a pH of 2.7. The autoclave contained a platinum electrode as cathode, the wall of the autoclave was connected as anode, the voltage was 20 volts and the current intensity during polymerization amounted to 250 milliamperes. At the wall of the autoclave the current density was found to be 500 milliamperes/$m^2$. The polymerization was carried out as described in Example 1. After 10 consecutive polymerizations the inner surface of the autoclave was still free from deposit.

EXAMPLE 4

A suspension polymerization was carried out under the conditions of Example 3 with the exception that a stainless steel electrode was used as cathode instead of the platinum electrode. In this case, too, the inner surface of the autoclave and the cathode were free from deposit after 10 polymerizations.

EXAMPLE 5

A 40 liter autoclave lined with stainless steel and provided with stirrer was successively charged with
  23 liters of desalted water
  12 grams of polyvinyl alcohol
  56 grams of $H_3PO_4$
  56 grams of $NaH_2PO_4$
  16.5 grams of diisopropyl percarbonate (40% by weight solution in phthalate)
The pH of the starting mixture was 2.7. A platinum cathode was used, the reactor wall was the anode. The voltage applied of 20 volts resulted in a current intensity of 250 milliamperes. At the wall of the autoclave the current density was 500 milliamperes/$m^2$. After removal of the air in the autoclave by repeated evacuation and passing through gaseous vinyl chloride, 9.5 kg of vinyl chloride and 1.65 kg of vinyl acetate were forced in. The polymerization was carried out as specified in Example 1. After termination of the polymerization the inner surface of the autoclave was completely free from deposit.

EXAMPLE 6

The polymerization was carried out as described in Example 5 with 10 kg of vinyl chloride and 1.1 kg of butyl acrylate. After termination of the polymerization the wall of the autoclave was completely free from deposit.

EXAMPLE 7

The polymerization was carried out as described in Example 5 with 10 kg of vinyl chloride and 1.1 kg of acrylonitrile. After termination of the polymerization no deposit had formed on the wall.

EXAMPLE 8

A suspension polymerization was carried out under the conditions of Example 1 using as initiator 36 grams of dilauroyl peroxide instead of diisopropyl percarbonate. Voltage 15 volts, current intensity 150 milliamperes, current density at the wall of the vessel 300 milliamperes/$m^2$. After a polymerization period of 8 hours the reaction mixture was cooled, the pressure in the autoclave was released and the autoclave was emptied. The wall of the vessel was absolutely clean and no deposit formed after 9 further polymerizations under the same conditions.

EXAMPLE 9

A suspension polymerization was carried out under the conditions of Example 1 at a temperature of 68°C using as initiator 20 grams of dilauroyl peroxide. Voltage 20 volts, current intensity 200 milliamperes, current density at reactor wall 400 milliamperes/$m^2$. After a polymerization period of 9 hours the mixture was cooled, the pressure released and the autoclave was emptied. The polymerization was repeated 10 times under the specified conditions. Thereafter the wall of the autoclave was still completely clean.

EXAMPLE 10

A suspension polymerization was carried out under the conditions of Example 1 using 110 grams of $Na_2H$-

PO₄ instead of 45 grams of NaH₂PO₄ and 45 grams of H₃PO₄ so that the starting mixture had a pH of 9. Voltage 20 volts, current intensity 200 milliamperes, current density at the reactor wall 400 milliamperes/m². After a polymerization period of 6 hours the pressure was released and the polymerization batch removed from the reactor. After 10 polymerizations under the aforesaid conditions the wall was still entirely free from deposit.

EXAMPLE 11

A 400 liter autoclave lined with stainless steel and provided with stirrer was charged with
 220 liters of desalted water
 80 grams of polyvinyl alcohol
 9 grams of hydroxypropyl cellulose
 250 grams of NaH₂PO₄
 250 grams of H₃PO₄
 100 grams of diisopropyl percarbonate (40% by weight solution in phthalate)

The mixture had a pH of 2.7. A platinum plated electrode was used as cathode and the reactor wall connected as anode. Voltage 50 volts, current intensity 150 milliamperes, current density at reactor wall 60 milliamperes/m². The polymerization was carried out under the conditions of Example 1 with 90 kg of vinyl chloride at a temperature of 53°C while stirring. After a polymerization period of 6 hours the pressure was released and the batch removed from the autoclave. No wall deposit could be observed after 10 polymerizations under the aforesaid conditions.

EXAMPLE 12

A suspension polymerization was carried out under the conditions of Example 11, using, however, 100 grams of NaH₂PO₄ and 100 grams of H₃PO₄. The initial mixture had a pH of 2.7, the voltage was 50 volts, the current intensity 130 milliamperes and the current density at the reactor wall 50 milliamperes/m². After a polymerization period of 6 hours the reaction mixture was cooled, the pressure released and the batch removed from the autoclave. After 10 polymerizations under the specified conditions the reactor wall was still absolutely clean.

EXAMPLE 13

A 40 liter autoclave lined with stainless steel and provided with stirrer was charged with
 23 liters of desalted water
 11 grams of polyvinyl alcohol
 1.27 grams of hydroxymethyl cellulose
 0.28 gram of a block copolymer of ethylene and propylene oxide
 50 grams of Na₂HPO₄
 5.1 grams of H₃PO₄
 16.5 grams of diisopropyl percarbonate (40% by weight solution in phthalate)

A platinum-plated electrode was used as cathode, the reactor wall connected as anode. The voltage was 35 volts resulting in a current intensity of 200 milliamperes. The current density at the reactor wall was 400 milliamperes/m². The initial pH was 7.1. After the usual scavenging of the reactor, 11 kilograms of vinyl chloride were forced in and polymerized at 55°C while stirring until the drop in pressure $\Delta p$ was 4 atmospheres gauge. After a polymerization period of 6 hours the mixture was cooled, the pressure released and the batch removed from the reactor. After 5 polymerizations carried out under the aforesaid conditions no deposit was observed on the reactor wall and the electrode.

EXAMPLE 14

The polymerization was carried out as described in Example 13 with the exception that 84 grams of citric acid and 32 grams of NaOH were used instead of Na₂HPO₄/H₃PO₄. The voltage was 35 volts, the current intensity 200 milliamperes, the current density at the reactor wall 400 milliamperes/m². The pH of the initial mixture was 4.3. After 5 polymerizations some areas of the reactor wall were covered with a thin layer which could be easily removed mechanically.

EXAMPLE 15

A 400 liter autoclave lined with stainless steel and provided with stirrer was successively charged with
 200 liters of desalted water
 120 grams of polyvinyl alcohol
 450 grams of H₃PO₄
 450 grams of NaH₂PO₄
 120 grams of diisopropyl percarbonate (40% by weight solution in phthalate)

The mixture had a pH of 2.7. The autoclave contained a platinum plated electrode as cathode, the wall was connected as anode. During the whole polymerization period the voltage was maintained at 20 volts, the current intensity being 150 milliamperes. The current density at the reactor wall was 60 milliamperes/m². After removal of the air in the autoclave by repeatedly evacuating and passing through gaseous vinyl chloride 90 kg of vinyl chloride were forced in, the reaction mixture was heated to 58°C while stirring and
 90 liters of desalted water
 40 grams of polyvinyl alcohol
 150 grams of H₃PO₄
 150 grams of NaH₂PO₄
 40 grams of diisopropyl percarbonate as 40% by weight aqueous solution diluted with little acetone and
 30 kilograms of vinyl chloride
were added per hour. The discharge of polymer was adjusted in such a manner that the polymerization pressure remained constant. The polymerization was interrupted after 30 hours, the remaining mixture was discharged and the reactor opened. The wall was absolutely clean and free from deposit.

In a comparative continuous polymerization under the same conditions but without application of current, i.e. without electrolysis, the polymerization had to be interrupted after 30 hours since the dissipation of heat through the reactor wall had broken down. On the average, the reactor wall was covered with a 7 cm thick contiguous layer which was still thicker in some places. It was very difficult to remove mechanically.

EXAMPLE 16 (comparative example)

The polymerization was carried out in the same apparatus and under the same conditions as in Example 1, with the exception, however, that the platinized electrode was connected as anode and the wall of the reactor as cathode. During polymerization the current intensity was maintained constant at 500 milliamperes corresponding to a current density of 1,000 milliamperes/m². The necessary voltage rose to 50 volts. Polymerization temperature, drop in pressure and polymerization period were the same as in Example 1. After each polymerization the vessel was opened and examined. After the third polymerization a deposit had formed in places which had further grown after the fourth polymerization, partially to a thickness of 0.5 mm. During the fourth polymerization the flow of current through the polymerization vessel was distinctly impeded so that the experiment had to be interrupted.

What is claimed is:

1. In the process of suspension polymerization of vinyl chloride in a liquid polymerization mixture within a reactor with from 0 to 20 percent by weight of at least one monomer polymerizable therewith in the presence of activators, stabilizers and auxiliary stabilizers normally used in the suspension polymerization of vinylchloride, the improvement comprising minimizing deposits formed on the walls of the reactor during polymerization by conducting the polymerization in a reactor having inner stainless steel or noble metal surfaces in contact with the polymerization mixture, said stainless steel or noble metal surfaces being connected as an anode, said liquid polymerization medium being in contact with at least one cathode insoluble therein and spaced from said anode, said cathode and anode being connected by an external source of current, applying external voltage to said anode and cathode during polymerization thereby electrolytically generating hydrogen and oxygen in the liquid polymerization mixture at said surfaces, the external voltage being of such magnitude that substantial dissolution of the stainless steel or noble metal surfaces does not occur.

2. The process as claimed in claim 1, wherein buffer substances are added to the polymerization mixture.

3. The process as claimed in claim 1, wherein the polymerization is started at a pH in the range of from 1 to 12.

4. The process as claimed in claim 1, wherein the current density is in the range of from 5 to 3,000 milliamperes/$m^2$.

5. The process as claimed in claim 1, wherein the current density is the highest in the starting phase of the polymerization.

6. The process of claim 1, wherein a sufficient amount of a supporting electrolyte is added to the polymerization mixture to improve the conductivity of the mixture.

7. The process according to claim 1, wherein the polymer produced during the polymerization is a graft-polymer.

8. The process according to claim 1 wherein the current density is in the range of from 20 to 800 milliamperes/$m^2$.

9. The process as claimed in claim 1 wherein the polymerization is carried out as a continuous process.

* * * * *